(12) United States Patent
Pastor

(10) Patent No.: US 11,714,337 B2
(45) Date of Patent: Aug. 1, 2023

(54) RETROFIT TRIGGER WEIGHT CAMERA DEVICE AND METHOD

(71) Applicant: FUGRO N.V., Leidschendam (NL)

(72) Inventor: Chad Pastor, Lafayette, LA (US)

(73) Assignee: Fugro N.V., Leidschendam (NL)

( * ) Notice: Subject to any disclaimer, the term of this patent is extended or adjusted under 35 U.S.C. 154(b) by 309 days.

(21) Appl. No.: 17/297,402

(22) PCT Filed: Dec. 11, 2019

(86) PCT No.: PCT/IB2019/060679
§ 371 (c)(1),
(2) Date: May 26, 2021

(87) PCT Pub. No.: WO2020/121228
PCT Pub. Date: Jun. 18, 2020

(65) Prior Publication Data
US 2022/0011653 A1    Jan. 13, 2022

Related U.S. Application Data

(60) Provisional application No. 62/778,137, filed on Dec. 11, 2018.

(51) Int. Cl.
*G03B 17/56* (2021.01)
*G03B 17/08* (2021.01)
*G03B 17/38* (2021.01)
*H04N 23/51* (2023.01)

(52) U.S. Cl.
CPC .......... *G03B 17/56* (2013.01); *G03B 17/08* (2013.01); *G03B 17/38* (2013.01); *H04N 23/51* (2023.01)

(58) Field of Classification Search
CPC ..... B63B 22/06; B63B 22/18; B63B 2205/06; B63C 11/52; B66D 1/485; B66D 1/525; B66D 1/60; G01C 21/12; G01L 19/0092
See application file for complete search history.

(56) References Cited

U.S. PATENT DOCUMENTS

| | | | |
|---|---|---|---|
| 2014/0348593 A1* | 11/2014 | Kawahara | G01C 21/12 405/224 |
| 2018/0175713 A1* | 6/2018 | Fretz | H02K 3/04 |
| 2019/0195200 A1* | 6/2019 | Daniel | B66D 1/60 |
| 2020/0239116 A1* | 7/2020 | Miwa | B63C 11/48 |

FOREIGN PATENT DOCUMENTS

| | | |
|---|---|---|
| JP | H08216985 A | 8/1996 |
| JP | 2001151474 A | 6/2001 |
| WO | 2017010060 A1 | 1/2017 |
| WO | 2020121228 A1 | 6/2020 |

OTHER PUBLICATIONS

International Search Report and Written Opinion; PCT Application No. PCT/IB2019/060679; dated Mar. 15, 2020.

* cited by examiner

*Primary Examiner* — Amy R Hsu
(74) *Attorney, Agent, or Firm* — Polsinelli PC

(57) ABSTRACT

A trigger weight camera device that is retrofittable to existing equipment to image underwater objects and underwater processes, and method of using the device to image the underwater objects and the underwater processes, and operate as a trigger weight for the existing equipment.

20 Claims, 5 Drawing Sheets

RETROFIT TRIGGER WEIGHT CAMERA DEVICE AND METHOD

CROSS-REFERENCED TO RELATE APPLICATIONS

This application is a national stage application of International Application No. PCT/IB2019/060679, which was filed on Dec. 11, 2019, which claims benefit to U.S. Provisional Application No. 62/778,137, filed on Dec. 11, 2018, the entire contents of both are hereby incorporated herein by reference.

BACKGROUND

1. Field

The present inventive concept generally relates to underwater imaging systems, and more specifically to an underwater imaging system operable to be retrofitted to existing equipment, to function as a trigger weight for the existing equipment, and to support one or more accessories for underwater imaging of the existing equipment. The one or more accessories may include a light, a camera, a laser, a laser scaler, and/or other imaging apparatus.

2. Description of Related Art

Many industries require underwater surveillance to track underwater objects and underwater processes. Conventional tracking cameras require complex control systems and equipment. Such conventional tracking cameras require users to submerge the cameras into water via entirely separate and independent equipment, which increases risk of displacement of the cameras relative to the underwater objects and underwater processes. Indeed, such conventional tracking cameras require users to maintain stability of the cameras while ensuring the cameras are correctly positioned and correctly oriented to track the underwater objects and underwater processes. Further, such conventional tracking cameras are expensive to manufacture and difficult to implement.

Therefore, a need exists for a new underwater imaging system operable to securely position imaging equipment in an orientation that facilitates tracking of underwater objects and underwater processes, that ensures quality of underwater surveillance, that provides increased security of the cameras, that is inexpensive to manufacture, and that is easy to implement.

SUMMARY

The present inventive concept eliminates the aforementioned problems associated with conventional coring cameras. The present inventive concept provides a device that is retrofittable to existing equipment, is operable to function as a trigger weight in coordination with the existing equipment, is operable to securely position imaging equipment in an orientation that facilitates tracking of underwater objects, e.g., the existing equipment, and/or underwater processes, and provides increased security of the imaging equipment. The device of the present inventive concept provides higher quality of underwater surveillance relative to conventional equipment, and protects marine environment and/or marine life forms by providing an ability to observe the marine environment prior to employing an underwater tool. The device of the present inventive concept ensures quality of core sampling by providing images of the existing equipment in use, e.g., impact of a corer, and also saves time by identifying problems associated with the existing equipment and/or their processes without requiring physical inspection of the existing equipment, e.g., a failed coring attempt can be identified without moving the corer on board a surface vessel. The device of the present inventive concept is inexpensive to manufacture, easy to implement, and easy to operate from a surface vessel.

The aforementioned may be achieved in an aspect of the present inventive concept by providing a retrofit trigger weight camera device. The device may include a base having a bottom face, a top face opposite the bottom face, and/or a side wall connecting the top face and bottom face. The device may include a central support member having a first end connected to the top face of the base, and/or a second end connected to one or more exterior support members. Each of the one or more exterior support members may include a first and/or a second end. The first end may be connected to the central support member. The second end may be connected to the base.

The device may include one or more accessory mounts attached to the central support member and operable to mount an accessory to the central support member. The device may include a connector attached to the second end of the central support member.

The base may include a plurality of apertures. The device may not be buoyant. The connector may be a pad eye. The one or more accessories may be a camera. The one or more accessories may be a light. The one or more accessories may be a laser scaler. The one or more accessories may be an acoustic monitoring device such as an echo sounder and/or an acoustic communication device. The one or more accessories may be an optical wireless communication device. The one or more accessories may be an acoustic modem. The one or more accessories may be a power supply. The one or more accessories may be operable for autonomous operation. The device may include a second connection member attached to the base. The one or both of the first and second connection members may be a pad eye. The base may be circular. The apertures may be circular. The base may have a central aperture. The central support member may include a plurality of apertures operable to mount one or more accessory mounts.

The device may include at least one accessory mount base. The at least one accessory mount base may include a first face opposite a second face. The first face of the accessory mount base may be operable to be attached to the central support member. The second face of the accessory mount base may be operable to attach an accessory mount. The device may be operable to be connected to a trigger arm of a piston corer. The first connection member is stationary. The first connection member may be connected to a non-rotating suspension member. The non-rotating suspension member may be a wire. The non-rotating member may be a rope. The non-rotating member may be a chain.

The aforementioned may be achieved in an aspect of the present inventive concept by providing a method of collecting coring data during a piston core sampling process via a retrofittable coring data collector apparatus. The method may include connecting the coring data collector apparatus to a piston corer. The apparatus may include a base having a bottom face, a top face opposite the bottom face, and/or a side wall connecting the top face and bottom face. The apparatus may include a central support member having a first end connected to the top face of the base, and a second end connected to one or more minor beams. Each of the one or more minor beams may have a first and a second end. The first end of the minor beams may be connected to the top face of the base. The second end of the minor beams may be connected to an area proximal to the second end of the central support member. The minor beams may form a cage around the center support beam. The apparatus may include one or more accessory mounts operable to mount an accessory to within the accessory mounts. The accessory mounts may be attached to the central support member. The apparatus may include a lifting connection member attached to the second end of the central support member.

The method may include connecting the lifting connection member to non-rotating suspension member connected to a trigger arm of the piston corer. The method may include mounting at least one camera in an accessory mount. The at least one camera may be oriented in a direction of the piston corer. The camera may be operable to monitor the piston corer. The method may include mounting at least one laser in an accessory mount. The at least one laser may be oriented in the direction of the piston corer. The at least one laser may be operable to monitor the piston corer. The method may include mounting at least one light in an accessory mount. The at least one light may be oriented in the direction of the piston corer. The at least one light may be operable to monitor the piston corer. The method may include mounting at least one acoustic monitoring device such as an echo sounder and/or at least one acoustic communication device in an accessory mount. The at least one acoustic monitoring device and/or the at least one acoustic communication device in the accessory mount may be oriented in the direction of the piston corer. The at least one acoustic monitoring device and/or the at least one acoustic communication device in the accessory mount may be operable to monitor the piston corer. The method may include mounting at least one optical wireless communication device in an accessory mount. The at least one optical wireless communication device mount may be oriented in the direction of the piston corer. The at least one optical wireless communication device in the accessory mount may be operable to monitor the piston corer. The method may include mounting at least acoustic modem device in an accessory mount. The at least one acoustic modem device mount may be oriented in the direction of the piston corer. The at least one acoustic modem device in an accessory mount may be operable to monitor the piston corer. The at least one acoustic modem device in an accessory mount may be operable to activate other devices near the piston corer or the coring data collector apparatus. The one of more accessories may be operable to operate autonomously. The one or more accessories may be operable to wirelessly communicate with a user of the one or more accessories. It is foreseen that numerous types of underwater wireless communications may be utilized by the present inventive concept including, but not limited to those disclosed in U.S. Patent Publication No. 2017/0328982 and U.S. Pat. No. 5,303,207, which are incorporated herein by reference in their entireties.

The method may include activating the at least one camera, the at least one laser, the at least one acoustic monitoring device, the at least one acoustic communication device, the at least one optical wireless communication device, the at least one acoustic modem, and/or the at least one light using a control system. The method may include releasing the coring data collector apparatus, the piston corer, and the trigger arm into a body of water. The method may include allowing the coring data collector apparatus to contact a sea floor before the piston corer contact the sea floor such that, when the coring data collector apparatus touches the sea floor, slack is created in the non-rotating suspension member allowing the trigger arm to raise, thereby causing the piston corer to deploy and begin an underwater coring process. The method may include monitoring the piston corer using the at least one camera, at least one light, at least one laser, at least one acoustic monitoring device such as an echo sounder, an acoustic communication device, and/or at least one optical wireless communication device, wherein the at least one light, and at least one laser, are oriented towards impact of the piston corer penetrating the sea floor, a seafloor environment, and a core barrel exiting the sea floor.

The at least one camera may be operable to record a video of the piston corer before launch. The at least one camera may be operable to record a video of the piston corer after launch. The coring data collector apparatus may be operable to fall to a solid surface underwater before the piston corer is launched. The coring data collector apparatus may be operable to reach a solid surface underwater after the piston corer is launched. The coring data collector apparatus may be operable to capture still images, high definition images, and/or data. The data may be used for optimizing coring operations setup. The coring data collector apparatus may be operable to capture water column video to image gas or bubbles in the water column during deployment and recovery.

The aforementioned may be achieved in an aspect of the present inventive concept by providing another method of collecting sea floor data via a retrofittable weighted data collector apparatus. The method may include connecting the weighted data collector apparatus to a crane. The apparatus may have a base having a bottom face, a top face opposite the bottom face, and/or a side wall connecting the top face and bottom face. The apparatus may have a central support member having a first end connected to the top face of the base, and/or a second end connected to one or more minor beams. Each of the one or more minor beams may have a first and a second end. The first end of the minor beams may be connected to the top face of the base. The second end of the minor beams may be connected to an area proximal to the second end of the central support member. The minor beams may form a cage around the center support beam. The apparatus may have one or more accessory mounts operable to mount an accessory at least partially within the accessory mounts. The accessory mounts may be attached to the central support member. The apparatus may have a lifting connection member attached to the second end of the central support member.

The method may include connecting the lifting connection member to a tether. The tether may be operable to suspend the weighted data collector apparatus above water. The method may include mounting at least one camera in an accessory mount. The method may include mounting at least one laser in an accessory mount. The method may include mounting at least one light in an accessory mount. The method may include activating the at least one camera, at least one laser, and at least one light using a control system. The method may include releasing the apparatus into water. The method may include collecting data using the at least one camera, at least one light, and at least one laser.

Other advantages of the invention will become apparent from the following description taken in connection with the accompanying drawings, wherein is set forth by way of illustration and example an embodiment of the present invention.

BRIEF DESCRIPTION OF THE DRAWINGS

In order to describe the manner in which the advantages and features of the present inventive concept can be obtained, reference is made to embodiments thereof which are illustrated in the appended drawings. Understanding that these drawings depict only exemplary embodiments of the present inventive concept and are not, therefore, to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Figure 1:
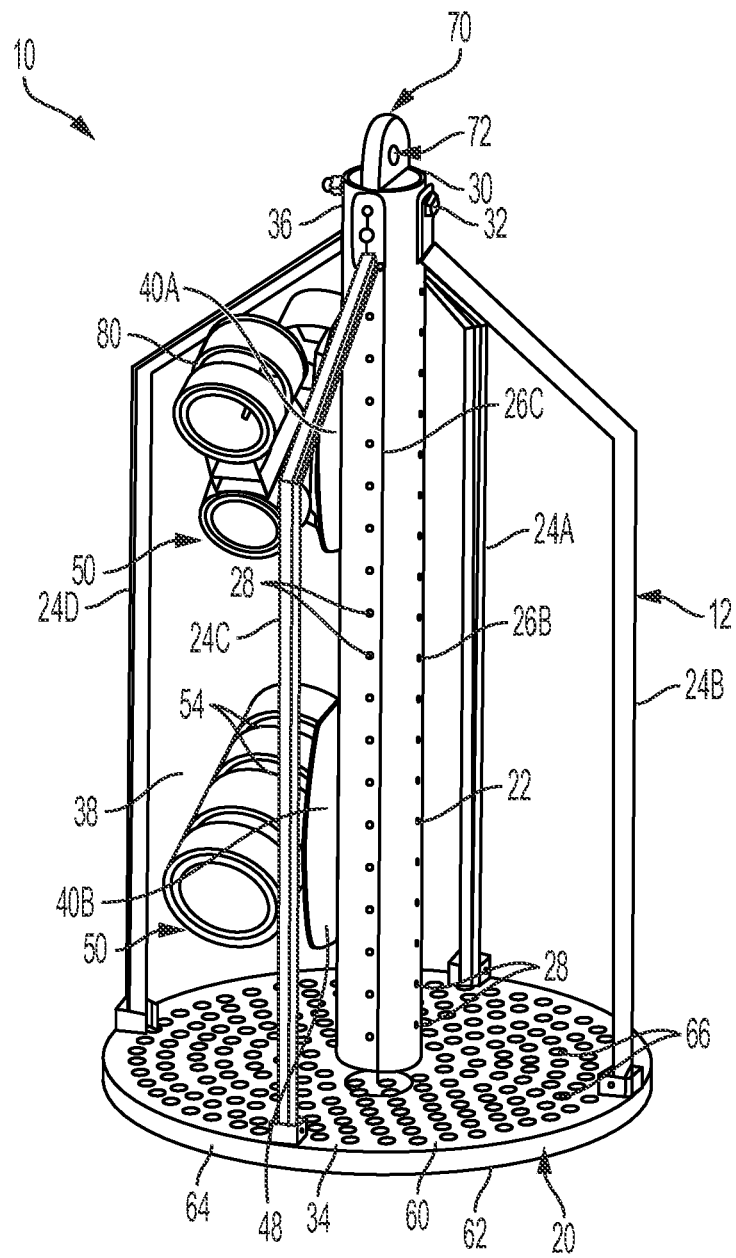
FIG. 1 is a perspective view of a retrofit trigger weight camera device according to an exemplary embodiment of the present inventive concept.
Figure 2:
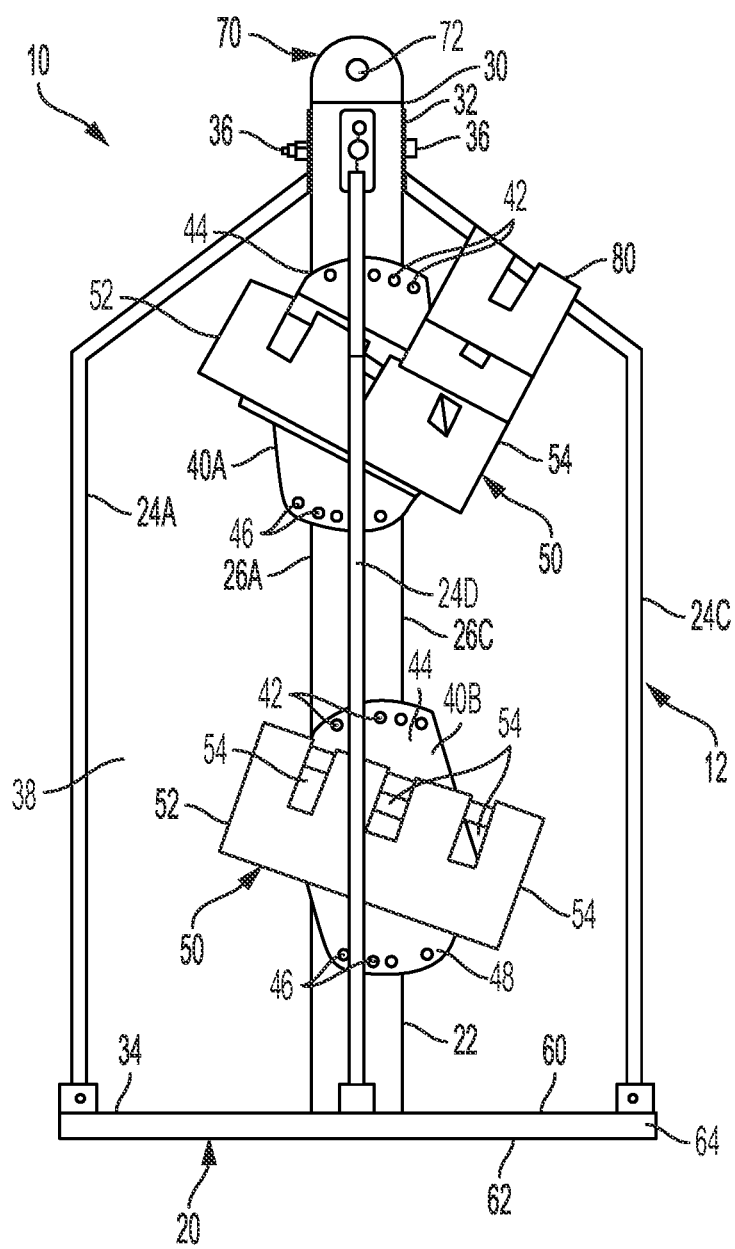
FIG. 2 is an elevated front view of the retrofit trigger weight camera device of FIG. 1.
Figure 3:
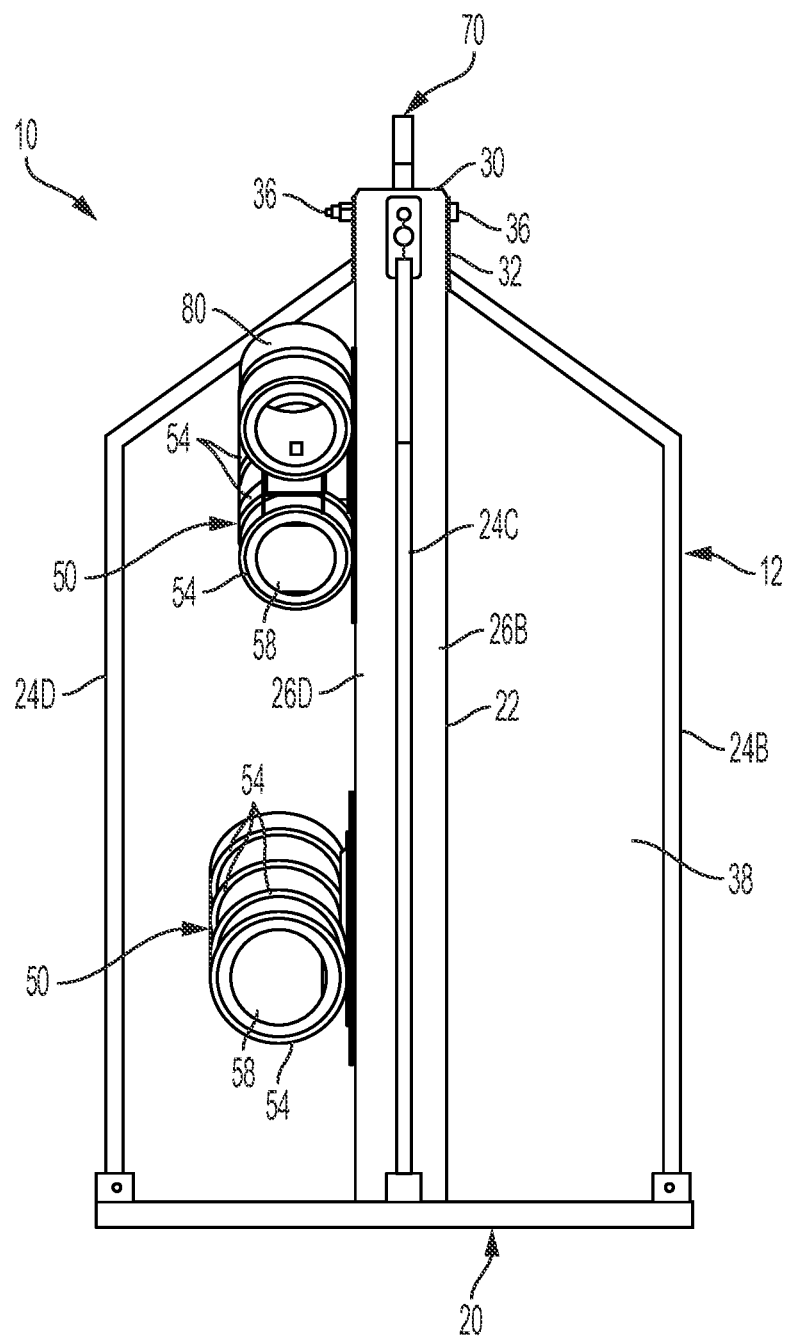
FIG. 3 is an elevated front view of the retrofit trigger weight camera device of FIG. 1.
Figure 4:
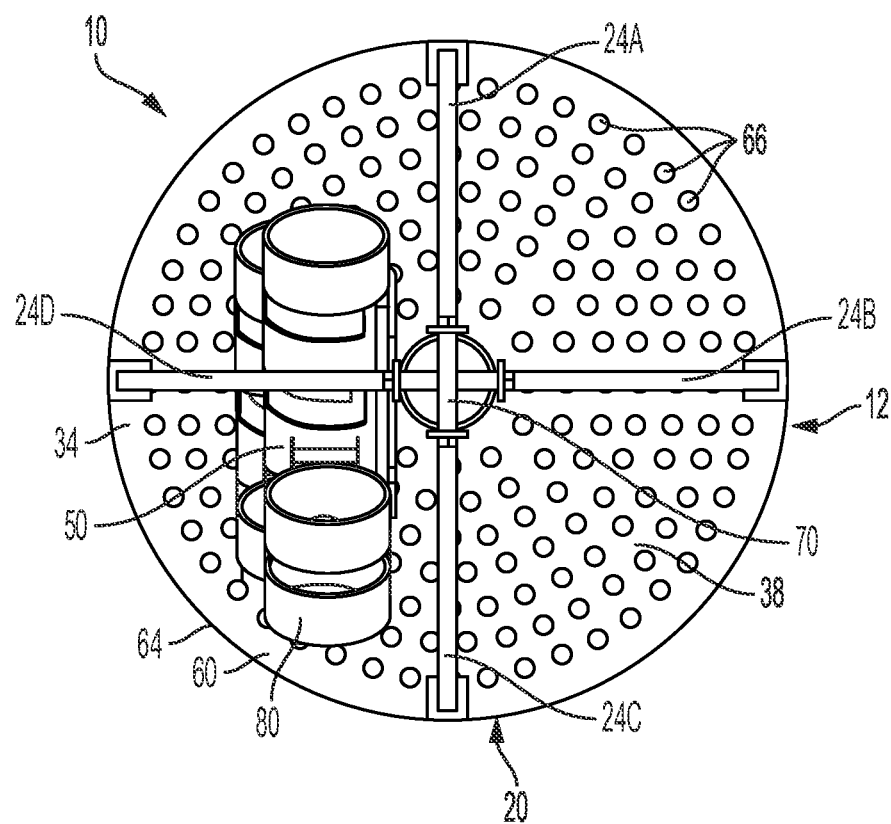
FIG. 4 is a top plan view of the retrofit trigger weight camera device of FIG. 1.
Figure 5:
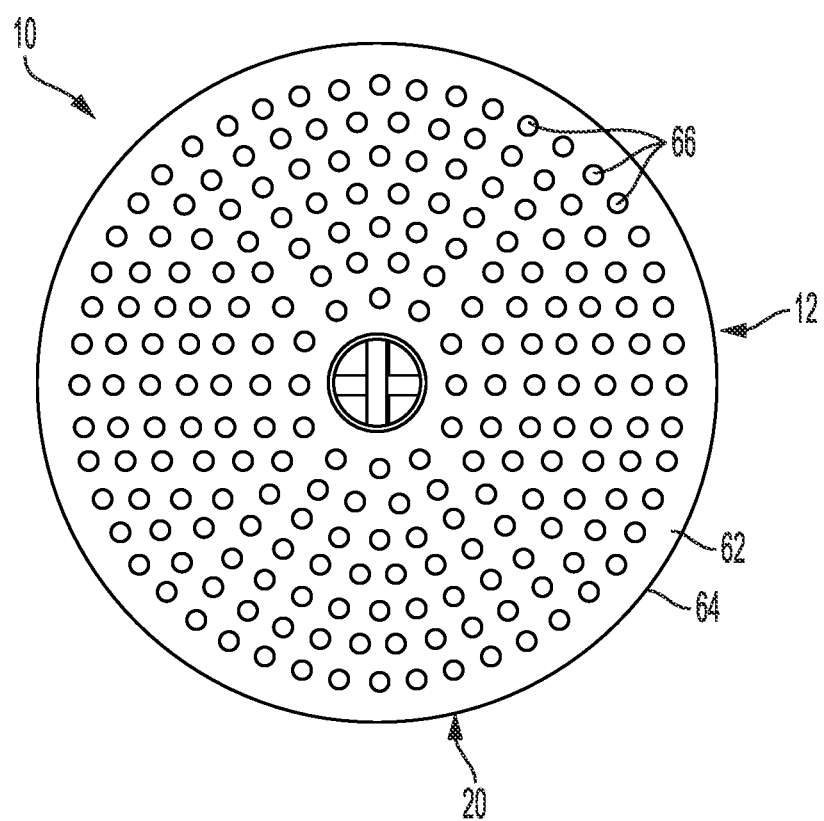
FIG. 5 is a bottom plan view of the retrofit trigger weight camera device of FIG. 1.

Turning to FIGS. 1 through 5, a retrofit trigger weight camera device 10 according to an exemplary embodiment of the present inventive concept is illustrated. The device 10 includes a platform base 20, an elongated central or interior support member 22 extending from a center of the base 20, and a plurality of elongated exterior support members 24 A-D extending between the base 20 and the interior support member 22. In the exemplary embodiment, the base 20 is generally circular, but it is foreseen that the base 20 may be otherwise shaped, e.g., square, rectangular, or triangular, without deviating from the scope of the present inventive concept. In the exemplary embodiment, the device 10 includes four of the plurality of exterior support members 24 A-D, but it is foreseen that the device 10 may have fewer ones of the plurality of exterior support members 24 A-D, e.g., three, two, one, or zero, or more ones of the plurality of exterior support members 24 A-D. It is also foreseen that the device 10 may have more ones of the plurality of exterior support members 24 A-D, e.g. five, six, or more, without deviating from the scope of the present inventive concept.

The interior support member 22 includes a plurality of rows 26 A-D of apertures 28 circumferentially spaced from each other around a circumference of the interior support member 22. Each of the apertures 28 is linearly spaced from others of the apertures 28 in respect to ones of the plurality of rows 26 A-D. Each of the plurality of rows 26 A-D is aligned with and directly facing one of the exterior support members 24 A-D. The apertures 28 extend entirely along the interior support member 22, i.e., from the base 20 to an upper end 30 of the interior support member 22.

Each of the plurality of exterior support members 24 A-D are secured to an uppermost portion 32 of the interior support member 22 and an outermost portion 34 of the base 20. The plurality of exterior support members 24 A-D are secured to the uppermost portion 32 of the interior support member 22 via the apertures 28 using a fastener 36. In this manner, the plurality of exterior support members 24 A-D define an interior space 38 in coordination with the base 20 and the interior support member 22. In the exemplary embodiment, the fastener 36 is a bolt. It is foreseen, however, that the plurality of exterior support members 24 A-D may be connected to the interior support member 22 and/or the base 20 via other fastening means such as, but not limited to, screws, adhesive, welding, and/or the like, without deviating from the scope of the present inventive concept.

Within the interior space 38 and securely fastened along different portions of the interior support member 22 are a plurality of mounting plates 40 A-B. In the exemplary embodiment, the device 10 includes two of the plurality of mounting plates 40 A-B, but it is foreseen that the device 10 may have fewer ones of the plurality of mounting plates 40 A-B, e.g., one, or more ones of the plurality of mounting plates 40 A-B, e.g., three, four, five, six, or more, without deviating from the scope of the present inventive concept. Each of the plurality of mounting plates 40 A-B include a plurality of upper apertures 42 at an upper end 44 thereof, and a plurality of lower apertures 46 at a lower end 48 thereof. Each of the plurality of upper apertures 42 and the plurality of lower apertures 46 extend entirely through a respective one of the plurality of mounting plates 40 A-B to permit variable mounting of the plurality of mounting plates 40 A-B to the interior support member 22. In the exemplary embodiment, the device 10 includes five of the plurality of upper apertures 42 and five of the plurality of lower apertures 46, but it is foreseen that the device 10 may have fewer ones of the plurality of upper apertures 42 and/or the plurality of lower apertures 46, e.g., one, two, three, or four, and/or more ones of the plurality of upper apertures 42 and/or the plurality of lower apertures 46, e.g., six, seven, eight, or more, without deviating from the scope of the present inventive concept. In the exemplary embodiment, each of the plurality of upper apertures 42 and the plurality of lower apertures 46 have a same diameter, but it is foreseen that one or more of the plurality of upper apertures 42 and/or the plurality of lower apertures 46 may have different diameters, without deviating from the scope of the present inventive concept.

Each of the plurality of mounting plates 40 A-B includes an accessory housing 50. In the exemplary embodiment, the accessory housing 50 is elongated and generally tubular, but it is foreseen that the accessory housing 50 may be otherwise shaped, without deviating from the scope of the present inventive concept. The accessory housing 50 is open at a first end 52, is open at a second end 54, and includes a plurality of elongated slots 56 that extend only partially around the accessory housing 50 and around top portions of the accessory housing 50. In this manner, the first end 52, the second end 54, and the slots 56 are operable to expose an interior 58 of the accessory housing 50.

The base 20 of the device 10 includes a top face 60 opposite a bottom face 62, with a perimeter edge 64 extending therebetween. The top face 60 and the bottom face 62 are substantially flat and extend parallel to each other. An array of base apertures 66 of the same size and shape extend entirely through the base 20. In the exemplary embodiment, the array of base apertures 66 is uniform across an entirety of the base 20. It is foreseen, however, that base 20 may include only a single aperture extending therethrough, or the array of base apertures 66 of the may have a non-uniform distribution across the base 20, and/or any one or more of the apertures of the array of base apertures 66 may be of different sizes and/or shapes, without deviating from the scope of the present inventive concept.

The device 10 includes a connector 70 with an aperture 72, which is secured to and extends from the upper end 30 of the interior support member 22. The connector 70 defines an uppermost portion of the device 10. The connector 70 is operable to securely receive a tether through the aperture 72. The tether may be a rope, a chain, or other tethering member extending from existing equipment such as, but not limited to, a tool, e.g., a piston corer. The device 10, via the connector 70, permits a crane or other lifting equipment to simultaneously lift the device 10 as well as the existing equipment from a resting or a docked position to an airborne position. The connector 70 enables the device 10 to be retrofitted to the existing equipment. In the exemplary embodiment, the device 10 is secured to the existing equipment instead of another piece of equipment. In the exemplary embodiment, the device 10 is operable to function and be used as a trigger weight in place of the another piece of equipment.

A plurality of accessories is securely received by the device 10, which each one of the plurality of accessories received within a respective one of the accessory housing 50 of the device 10. The plurality of accessories may include one or more imaging devices, e.g., one or more cameras, one or more laser scalers, one or more lights, one or more acoustic monitoring devices such as an echo sounder, one or more acoustic communication devices, one or more optical wireless communication devices, and/or one or more power supplies. In the exemplary embodiment, the accessory housing 50 A is operable to securely mount a camera and the accessory housing 50 B is operable to securely mount a laser scaler. The accessory housing 50 A includes a secondary accessory housing 80 secured thereto, which is operable to securely mount a light therein. In some embodiments, the accessory housing 50 A-B and/or the secondary accessory housing 80 is operable to securely mount an optical wireless communication device, a power supply, an acoustic monitoring device, such as an echo sounder, and/or an acoustic communication device. The accessory housing 50 A-B has a universal configuration for mounting a wide array of accessories. Each of the accessory housings 50 A-B and the secondary accessory housing 80 are operable to orient one of the plurality of accessories in an orientation to facilitate imaging, monitoring, and collecting data associated with underwater objects and/or underwater processes.

In use, the device 10 is provided in a docked or initial position, e.g., on a deck of a drilling rig, dock, or boat. Each of the plurality of accessories is installed into a respective one of the accessory housing 50 A-B and the secondary housing 80, so a face of each of the plurality of accessories extends into the interior 58 of housings 50 A-B through the first end 52 and is directed toward the second end 54. Once installed, each of the plurality of accessories is activated. In this manner, after activation, the accessories are operable to autonomously image, autonomously collect data, and/or autonomously track underwater objects. Next, the device 10 is retrofitted to the existing equipment via the tether. In the exemplary embodiment, the existing equipment of the piston corer and the device 10 is secured to a piston corer trigger arm of the corer in place of a part of the piston corer. In this manner, the device 10 is operable to be used with the piston corer as a trigger weight to cause the piston corer to begin an underwater operation, e.g., a coring operation.

Then, upon connection of the piston corer to the crane via a non-rotatable tether, the device 10 and the piston corer are simultaneously moved into the airborne position and then submerged. Once deployed into the water, the piston corer is triggered when the device 10 contacts the sea floor via the base 20. While deployed in water, the accessories of the device 10 operate autonomously, in the exemplary embodiment. It is foreseen, however, that one or more of the accessories of the device 10 may be controlled by a user, e.g., wirelessly or wired. It is also foreseen that numerous types of underwater wireless communications may be utilized by the present inventive concept including, but not limited to those disclosed in U.S. Patent Publication No. 2017/0328982 and U.S. Pat. No. 5,303,207, which are incorporated herein by reference in their entireties.

The piston corer is used to perform its desired operation while images of the piston corer as well as an underwater environment and/or the seafloor are collected using the plurality of accessories. The non-rotatable tether advantageously ensures the accessories of the device are aimed at the piston corer. The images are stored using a memory of one of the plurality of accessories, e.g., a memory of the camera. When the desired operation is completed by the piston corer, the crane removes the device 10 and the piston corer from the water, returns the device 10 and the piston corer to the airborne position, and returns the device 10 and the piston corer to the initial position. When the device 10 is in the initial position, the memory of the one of the plurality of accessories may be accessed, and the images may be transferred from the memory to a display, e.g., of a computer of an operator for review of the operation completed by the tool, the underwater environment and/or the seafloor.

In this manner, the device 10 of the present inventive concept is retrofittable to existing equipment, is operable to act as a trigger weight, is operable to securely position imaging equipment in an orientation that facilitates tracking of underwater objects and/or underwater processes, provides increased security of the imaging equipment, is inexpensive to manufacture, and is easy to implement.

What is claimed is:

1. A retrofit trigger weight camera device comprising:
   a base having a bottom face, a top face opposite the bottom face, and a side wall connecting the top face and bottom face;
   a central support member having a first end connected to the top face of the base, and a second end connected to one or more exterior support members, each of the one or more exterior support members include a first and a second end, the first end connected to the central support member, the second end connected to the base;
   one or more accessory mounts attached to the central support member and operable to mount one or more accessories to the central support member; and
   a connector attached to the second end of the central support member.

2. The device in claim 1, wherein the one or more accessories is one of a camera, a light, a laser scaler, an acoustic monitoring device, an acoustic communication device, an optical wireless communication device, or a power supply device.

3. The device of claim 2, wherein the camera is operable for capturing high definition video or high resolution still imagery.

4. The device of claim 3, wherein the video streamed to a surface vessel.

5. The device of claim 3, wherein the still imagery is transferred to a surface vessel.

6. The device of claim 1, further comprising:
a second connection member attached to the base, and wherein one or both of the first and second connection members are a pad eye.

7. The device of claim 1, further comprising:
at least one accessory mount base, the at least one accessory mount base including a first face opposite a second face, the first face of the accessory mount base operable to be attached to the central support member, and the second face of the accessory mount base operable to attach an accessory mount.

8. The device of claim 1, wherein the device is operable to be connected to a trigger arm of a piston corer.

9. The device of claim 8, wherein the first connection member is stationary.

10. The device of claim 1, wherein the first connection member is connected to a non-rotating suspension member.

11. The device of claim 10, wherein the non-rotating suspension member is one or a wire, a rope or a chain.

12. The device of claim 1, wherein the one or more accessories are configured for autonomous operation.

13. A method of collecting coring data during a piston core sampling process via a retrofittable coring data collector apparatus, the method comprising:
connecting the coring data collector apparatus to a piston corer, the apparatus having a base having a bottom face, a top face opposite the bottom face, and a side wall connecting the top face and bottom face; a central support member having a first end connected to the top face of the base, and a second end connected to one or more minor beams; each of the one or more minor beams having a first and a second end, the first end of the minor beams connected to the top face of the base, the second end of the minor beams connected to an area proximal to the second end of the central support member, the minor beams forming a cage around the center support beam; one or more accessory mounts operable to mount an accessory within the accessory mounts, wherein the accessory mounts are attached to the central support member; and a lifting connection member attached to the second end of the central support member;
connecting the lifting connection member to non-rotating suspension member connected to a trigger arm of the piston corer;
mounting at least one camera in an accessory mount, wherein the at least one camera is oriented in a direction of the piston corer, wherein the camera is operable to monitor the piston corer;
mounting at least one laser in an accessory mount, wherein the at least one laser is oriented in the direction of the piston corer, wherein the at least one laser is operable to monitor the piston corer;
mounting at least one light in an accessory mount, wherein the at least one light is oriented in the direction of the piston corer, wherein the at least one light is operable to monitor the piston corer;
activating the at least one camera, at least one laser, and at least one light using a control system;
releasing the coring data collector apparatus, the piston corer, and the trigger arm into a body of water;
allowing the coring data collector apparatus to contact a sea floor before the piston corer contact the sea floor, wherein when the coring data collector apparatus touches the sea floor, slack is created in the non-rotating suspension member allowing the trigger arm to raise, causing the piston corer to deploy; and
monitoring the piston corer using the at least one camera, at least one light, and at least one laser, wherein the at least one light, and at least one laser, are oriented towards impact of the piston corer penetrating the sea floor, a seafloor environment, and a core barrel exiting the sea floor.

14. The method of claim 13, wherein the at least one camera is operable to record a video of the piston corer before launch.

15. The method of claim 13, wherein the at least one camera is operable to record a video of the piston corer after launch.

16. The method of claim 13, wherein the coring data collector apparatus falls to a solid surface underwater before the piston corer is launched.

17. The method claim 13, wherein the coring data collector apparatus reaches a solid surface underwater after the piston corer is launched.

18. The method of claim 13, wherein the coring data collector apparatus captures water column video to image gas or bubbles in the water column during deployment and recovery.

19. The method of claim 13, wherein the accessory is configured for autonomous operation.

20. A method of collecting sea floor data via a retrofittable weighted data collector apparatus, the method comprising:
connecting the weighted data collector apparatus to a crane, the apparatus having a base having a bottom face, a top face opposite the bottom face, and a side wall connecting the top face and bottom face; a central support member having a first end connected to the top face of the base, and a second end connected to one or more minor beams; each of the one or more minor beams having a first and a second end, the first end of the minor beams connected to the top face of the base, the second end of the minor beams connected to an area proximal to the second end of the central support member, the minor beams forming a cage around the center support beam; one or more accessory mounts operable to mount an accessory to within the accessory mounts, wherein the accessory mounts are attached to the central support member; and a lifting connection member attached to the second end of the central support member;
connecting the lifting connection member to a tether, wherein the tether is operable to suspend the weighted data collector apparatus above water;
mounting at least one camera in an accessory mount;
mounting at least one laser in an accessory mount;
mounting at least one light in an accessory mount;
activating the at least one camera, at least one laser, and at least one light using a control system;
releasing the apparatus into water; and
collecting data using the at least one camera, at least one light, and at least one laser.

* * * * *